United States Patent [19]

Olin

[11] 3,884,673

[45] May 20, 1975

[54] HERBICIDAL 2-HALO-N-(ACYLOXYALKYLENE) ACETANILIDES

[75] Inventor: John F. Olin, Ballwin, Mo.

[73] Assignee: Monsanto Company, St. Louis, Mo.

[22] Filed: Nov. 30, 1973

[21] Appl. No.: 420,423

Related U.S. Application Data

[62] Division of Ser. No. 148,894, June 1, 1971, Pat. No. 3,830,829.

[52] U.S. Cl. ........................... 71/106; 71/88; 77/101
[51] Int. Cl. .............................................. A01n 9/24
[58] Field of Search ......... 71/106, 107, 88, 101, 90, 71/92, 93, 98

[56] References Cited
UNITED STATES PATENTS

| | | | |
|---|---|---|---|
| 2,523,187 | 9/1950 | Britton et al. | 260/473 G |
| 2,771,477 | 11/1956 | Deatley et al. | 260/473 G |
| 3,005,016 | 6/1959 | Young | 260/473 G |
| 3,158,645 | 11/1964 | Newcomer | 260/473 G |
| 3,546,273 | 12/1970 | Balhofer | 260/473 G |
| 3,769,301 | 10/1973 | Olin | 71/118 |

OTHER PUBLICATIONS

Olin, C. A. 59, 11330h (1963).
Roberts et al., Principles of Organic Chemistry, W. A. Benjamin, Inc., (1965), p. 561
Merker et al., J. Org. Chem., 26, 5180 (1961).

*Primary Examiner*—James O. Thomas, Jr.
*Attorney, Agent, or Firm*—William I. Andress

[57] ABSTRACT

Herbicidal acyloxyalkyl-2-halo-substituted acetanilides.

10 Claims, No Drawings

HERBICIDAL 2-HALO-N-(ACYLOXYALKYLENE) ACETANILIDES

This is a division of application Ser. No. 148,894, filed June 1, 1971 now U.S. Pat. No. 3,830,829.

This invention relates to novel acyloxyalkyl acetanilides which are useful as herbicides and to methods of preparing them. The invention also relates to herbicidal compounds and to methods of inhibiting or preventing the growth of plant systems.

The term "plants" is used herein to include germinant seeds, emerging seedlings and established vegetation, including the roots and above-ground portions.

The novel compounds of the present invention are represented by the formula

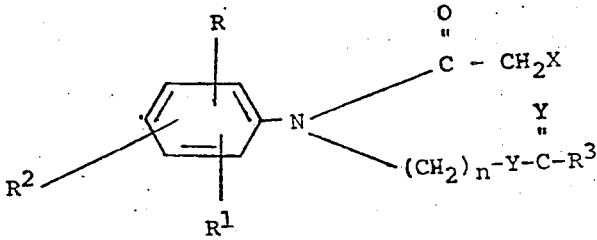

wherein:

R and $R^1$ are hydrogen, alkyl or alkoxy having at least 1 and not more than 10 carbon atoms and can be like or unlike, $R^2$ is hydrogen, alkyl or alkoxy having at least 1 and not more than 10 carbon atoms, $NO_2$ or halogen, $R^3$ is hydrogen, alkyl, alkenyl, alkynyl, alkoxy, alkylthio, polyalkoxy, polyalkylthio, alkoxyalkyl, alkylthioalkyl, polyalkoxyalkyl, polyalkylthioalkyl, haloalkyl, hydroxyalkyl, mercaptoalkyl, haloalkenyl, oxoalkyl, alkenyloxyalkyl, alkenylthioalkyl, each of a maximum of 18 carbon atoms; cycloalkyl having at least 3 and a maximum of 6 carbon atoms; aryl, aryloxyalkyl, arylthioalkyl, trifluoromethyl- and haloaryl, trifluoromethyl- and haloaryl oxyalkyl, trifluoromethyl- and haloarylthioalkyl, arylalkyl, nitroaryl, hydroxyaryl, nitroarylthioalkyl, and nitroarylalkyl having at least 6 and not more than 24 carbon atoms; amino or mono- and dialkylamino, monoarylamino, mono(haloaryl)amino, mono(trifluoromethylaryl)amino, and alkylalkoxyamino having a maximum of 10 carbon atoms; or pyranyl, furfuryl, thiofuranyl, thiazolyl, azolyl, pyronyl, pyridinyl, pyrazinyl, triazinyl, and the corresponding heterocycloalkyls having from 1 through 4 carbon atoms in the alkyl moiety.

X is chlorine, bromine or iodine,

Y is oxygen or sulfur, and $n$ is an integer of 1 or 2.

Unless otherwise indicated, alkyl and alkoxy is used generically to include primary, secondary, and tertiary alkyl groups.

Representative compounds of the present invention include those in which the groups of the above formula have the following identities:

R and $R^1$ - hydrogen, methyl, ethyl, propyl, isopropyl, n-butyl, primary isobutyl, secondary isobutyl, tertiary butyl, n-amyl, branch chain amyls, the normal and branched hexyls, heptyls, octyls, nonyls, and decyls, methoxy, ethoxy, propoxy, butoxy, pentyloxy, heptyloxy, nonyloxy;

$R^2$ - hydrogen, chlorine, bromine, fluorine, iodine, nitro and the alkyl and alkoxy groups of R and $R^1$.

$R^3$ - hydrogen, methyl, ethyl, propyl, isopropyl, n-butyl, primary isobutyl, secondary isobutyl, tertiary butyl, the normal and branched amyls, hexyls, heptyls, octyls, nonyls, decyls, dodecyls, tetradecyls, hexadecyls and octadecyls; chloromethyl, bromopropyl, iodobutyl, fluorohexyl, hydroxyethyl, dihydroxypropyl; the alkoxy, alkenyl, oxoalkyl, alkoxyalkyl and alkynyl groups corresponding to the above-enumerated alkyl groups; phenyl, tolyl, naphthyl, phenoxy, benzyl, phenoxyalkyl, chlorophenoxyalkyls; ethylene, trimethylene, tetramethylene; and the like.

The preferred compounds of the present invention are those in which both R and $R^1$ are ethyl and more particularly the compound in which they are in the ortho positions.

The novel compounds of the present invention in which $n$ is 1 are prepared by a carbonium ion type reaction of a 2-halo-N-(substituted methyl)acetanilide with a monocarboxylic acid. The methyl substituent can be any group that is capable of forming a carbonium ion and is readily displaced under acidic conditions. Thus, the starting material can be a 2-halo-N-methyl acetanilide in which the methyl group is substituted with a halo, alkoxy, alkylthio, hydroxy, mercapto, alkenoyloxy and similar leaving groups. It is particularly preferred, however, to utilize a 2-halo-N-chloromethyl acetanilide in the preparation of these compounds. A solvent can be used but in most instances is not generally required. While the reaction can be conducted at temperatures as low as 0°C, it is generally preferred to accelerate the reaction by conducting it under reflux conditions at the boiling point of the solvent in the system.

The 2-halo-N-(substituted methyl)acetanilide used as a starting material in this reaction is the adduct of a haloacetic acid derivative such as the halide or anhydride with a substituted azomethine or methylenearylamine of the type disclosed and claimed in application Ser. No. 625,020, filed Mar. 22, 1967, now abandoned. As more fully described in that application, the azomethines are prepared by the reaction of a suitably substituted aniline with formaldehyde. The 2-halo-N-halomethyl acetanilides that can be employed in preparing the present compounds are described and claimed in application, Ser. No. 855,030, filed Sept. 3, 1969, now U.S. Pat. No. 3,637,847.

The novel compounds of the present invention in which $n$ is 2 are readily prepared by the chloroacetylation of an N-(substituted phenyl-ether ester of the formula

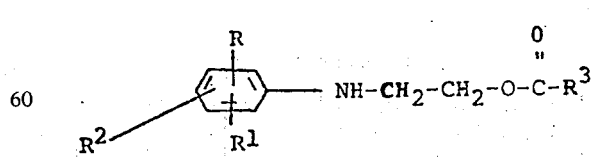

wherein R, $R^1$, $R^{2'}$ and $R^3$ are as described above. The ethyl ester derivatives used as starting materials for such reactions can be readily prepared in conventional manners by the alkylation of a substituted aniline with alkylating agents such as an N-(2-chloroethyl)-ethyl ester or an N-2-(hydroxyethyl)-ethyl ester.

The invention will be more clearly understood by reference to the following detailed description of specific examples thereof. In these examples and throughout the specification, all proportions are expressed in parts by weight unless otherwise indicated.

EXAMPLE 1

This example describes the preparation of 2-chloro-2',6'-diethyl-N-(propionyloxymethyl)acetanilide.

About 140 parts of 2-chloro-2',6'-diethyl-N-chloromethylacetanilide dissolved in tetrahydrofuran were introduced into a suitable reaction vessel and a solution of about 40 parts of propionic acid in tetrahydrofuran added. When the mixture was substantially uniform, about 55 parts of triethylamine were added incrementally. The solution was then heated to and maintained at reflux temperature for about 3 hours and cooled to room temperature. The resultant precipitate was removed from the reaction mixture by filtration and taken up in diethyl ether. The ether solution was washed with aqueous sodium bicarbonate solution, then with water and dried over magnesium sulfate. The solution was then vacuum stripped to obtain an oily residue which subsequently solidified and was recrystallized from hexane to yield a white solid having a melting point of 64°–65°C..

| Calc'd for $C_{16}H_{22}ClNO_3$: | C, 61.63 | H, 7.11 |
|---|---|---|
| Found: | C, 61.94 | H, 7.04 |

EXAMPLE 2

This example describes the preparation of 2-chloro-2',6'-diethyl-N-(formyloxymethyl)acetanilide. About 140 parts of 2-chloro-2',6'-diethyl-N-chloromethylacetanilide dissolved in tetrahydrofuran were charged into a suitable reaction vessel and about 25 parts of 99+ percent formic acid and 50 parts of triethylamine were added. The reaction mixture was then refluxed for about 3 hours and cooled to room temperature. The tetrahydrofuran was stripped from the mixture by vacuum distiallation. The residue was dissolved in diethyl ether and the ether solution washed first with aqueous sodium bicarbonate, then with water and finally dried over magnesium sulfate. The ether solution was vacuum distilled at 65°C under pressure of 5 mm. of mercury to provide a clear oily residual material.

| Calc'd for $C_{14}H_{18}ClNO_3$: | C, 59.26 | H, 6.39 |
|---|---|---|
| Found: | C, 59.32 | H, 6.47 |

EXAMPLE 3

This example describes the preparation of 2-chloro-2',6'-diethyl-N-(butyryloxymethyl)acetanilide. About 200 parts of 2-chloro-2',6'-diethyl-N-chloromethyl acetanilide dissolved in tetrahydrofuran were introduced into a suitable reaction vessel and well agitated. About 70 parts of n-butyric acid and about 80 parts of triethylamine were added incrementally with continued agitation. The reaction mixture was refluxed for about 3 hours, cooled to room temperature, filtered and the filtrate stripped by vacuum distillation. The residue was dissolved in diethyl ether, washed with aqueous sodium bicarbonate, water and then dried over magnesium sulfate. The magnesium sulfate was removed by filtration and the solvent stripped by distillation at 60°C and 1 mm. of mercury. The residue thus obtained is a red-orange oil.

| Calc'd for $C_{17}H_{24}ClNO_3$: | C, 62.66 | H, 7.42 |
|---|---|---|
| Found: | C, 63.01 | H, 7.73 |

EXAMPLE 4

This example describes the preparation of 2-chloro-2',6'-diethyl-N-(acrylyloxymethyl)acetanilide. About 200 parts of 2-chloro-2',6'-diethyl-N-chloromethylacetanilide, 55 parts of acrylic acid and about 80 parts of triethylamine were reacted in substantially the same manner as in the preceding example to provide an off-white solid material melting at 91°–96°C.

| Calc'd for $C_{16}H_{20}ClNO_3$: | C, 62.03 | H, 6.51 |
|---|---|---|
| Found: | C, 62.66 | H, 6.59 |

EXAMPLE 5

In a substantial repetition of the procedure of the foregoing examples, using cyclopropane carboxylic acid acid as a reactant, 2-chloro-2',6'-diethyl-N-(cyclopropanecarbonyloxymethyl)acetanilide, a solid product melting at 84°–87°C was obtained.

| Calc'd for $C_{17}H_{22}ClNO_3$: | C, 63.05 | H, 6.85 |
|---|---|---|
| Found: | C, 63.43 | H, 7.00 |

EXAMPLES 6 THROUGH 79

The following compounds are also prepared by substantial repetition of the general procedures set forth in the foregoing examples:

(6) 2-chloro-2',6'-diethyl-N-(isobutyryloxymethyl)acetanilide (7) 2-chloro-2',6'-diethyl-N-(methoxyacetoxymethyl)acetanilide (8) 2-chloro-2',6'-diethyl-N-(methacrylyloxymethyl)acetanilide (9) 2-chloro-2',6'-diethyl-N-(cinnamyloxymethyl)acetanilide

(10) 2-chloro-2',6'-diisopropyl-N-(butyryloxymethyl)acetanilide

(11) 2-bromo-2',3',6'-trimethyl-N-(acetoxymethyl)acetanilide

(12) 2-chloro-2',6'-diethyl-N-(3-ethoxypropionyloxymethyl)acetanilide

(13) 2-chloro-2',6'-diethyl-N-(2-chloroacetoxymethyl)acetanilide

(14) 2-chloro-2',6'-diethyl-N-(caprylyloxymethyl)acetanilide

(15) 2-chloro-2',6'-diethyl-N-(beta-chloropropionyloxymethyl)-acetanilide

(16) 2-chloro-2',6'-dimethyl-N-(propionyloxymethyl)acetanilide
(17) 2-chloro-2',6'-dimethyl-N-(butyryloxymethyl)acetanilide
(18) 2-chloro-2'-tertiarybutyl-6'-methyl-N-(acetoxymethyl) acetanilide
(19) 2-chloro-2',6'-diethyl-N-(carbamyloxymethyl)acetanilide
(20) 2-chloro-2',6'-diethyl-N-(benzoyloxymethyl)acetanilide
(21) 2-chloro-2',6'-diethyl-N-(phenylacetoxymethyl)acetanilide
(22) 2-chloro-2',6'-diisopropyl-N-(methacrylyloxymethyl)acetanilide
(23) 2-chloro-2',6'-diethyl-N-(3-ethylthiopropionyloxymethyl)acetanilide
(24) 2-chloro-2',6'-dimethyl-N-(lauryloxymethyl)acetanilide
(25) 2-bromo-2',6'-dimethyl-N-(methoxyformyloxymethyl)acetanilide
(26) 2-chloro-2'-tert-butyl-N-(valeryloxymethyl)acetanilide
(27) 2-chloro-2'-methyl-6'-ethyl-N-(acetoxymethyl)acetanilide
(28) 2-chloro-2',6'-diethyl-N-(2,3-dichloropropionyloxymethyl)acetanilide
(29) 2-chloro-2',6'-dimethyl-N-(methacrylyloxymethyl)acetanilide
(30) 2-chloro-2'-methyl-6'-tertiary butyl-N-(methacrylyloxymethyl)-acetanilide
(31) 2-chloro-2'-methoxy-6'-tertiary butyl-N-(methacrylyloxymethyl)-acetanilide
(32) 2-chloro-2',3'-dimethyl-6'-tertiary butyl-N-(acetoxymethyl)acetanilide
(33) 2-bromo-2'-methyl-6'-tertiary butyl-N-(methacrylyloxymethyl)-acetanilide
(34) 2-iodo-2',6'-diethyl-N-(cyclopropanecarbonyloxymethyl)acetanlide
(35) 2-chloro-2',6'-diethyl-N-(3-methoxypropionyloxymethyl)acetanilide
(36) 2-bromo-2'-ethyl-6'-tertiary-butyl-N-(acetoxymethyl)acetanilide
(37) 2-chloro-2',6'-diethyl-N-(acetoxyethyl)acetanilide
(38) 2-chloro-2',6'-diethyl-N-(2'',6''-dichlorobenzoyloxyethyl)acetanilide
(39) 2-chloro-2',6'-diethyl-N-(acrylyloxyethyl)acetanilide
(40) 2-chloro-2',6'-diethyl-N-(formylyloxyethyl)acetanilide
(41) 2-chloro-2',6'-diethyl-N-(3-chloro-2-methylpropionyloxyethyl)acetanilide
(42) 2-bromo-2',6'-diethyl-N-(acrylyloxyethyl)acetanilide
(43) 2-chloro-2'-ethyl-6'-methyl-N-(cyclopropanecarbonyloxymethyl)acetanilide
(44) 2-chloro-2',6'-diethyl-N-(cinnamyloxyethyl)acetanilide
(45) 2-chloro-2',6'-diisopropyl-N-(butryloxymethyl)acetanilide
(46) 2-chloro-2',6'-diethyl-N-(tert-butylacetoxymethyl)acetanilide
(47) 2-chloro-2',6'-diethyl-N-(ethoxypropionyloxymethyl)acetanilide
(48) 2-chloro-2',6'-diethyl-N-(ethoxyacetoxymethyl)acetanilide
(49) 2-chloro-2',6'-diethyl-N-(hydrocinnamyloxymethyl)acetanilide
(50) 2-chloro-2',6'-diethyl-N-(lauryloxymethyl)acetanilide
(51) 2-chloro-2',6'-diethyl-N-(3-methylcrotonyloxymethyl)acetanilide
(52) 2-chloro-2',6'-diethyl-N-(acetoxymethyl)acetanilide
(53) 2-bromo-6'-tert-butyl-N-(hydroxymethyl) O-acetotoluidide,(2,4-dichlorophenoxy)acetate
(54) 2-bromo-6'-tert-butyl-N-(hydroxymethyl)-o-acetotoluidide,2,5-dichloro-3-nitrobenzoate
(55) 2-bromo-6'-tert-butyl-N-(hydroxymethyl)-o-acetololuidide,3-amino-2,5-dichlorobenzoate
(56) 2-bromo-6'-tert-butyl-N-(hydroxymethyl)-o-acetotoluidide,2,4,5-trichlorophenoxy)acetate
(57) 2-bromo-6'-tert-butyl-N-(hydroxymethyl)-o-acetotoluidide,2,6-dichlorobenzoate
(58) 2-bromo-6'-tert-butyl-N-(hydroxymethyl)-o-acetotoluidide, 2-naphthyloxy)acetate
(59) 2-bromo-6'-tert-butyl-N-(hydroxymethyl)-o-Acetotoluidide, piperonylate
(60) 2-bromo-6'-tert-butyl-N-(hydroxymethyl)-o-acetotoluidide,5-nitrosalicylate
(61) 2-bromo-6'-tert-butyl-N-(hydroxymethyl)-o-acetotoluidide,1-naphthaleneacetate
(62) 2-bromo-6'-tert-butyl-N-(hydroxymethyl)-o-acetotoluidide,5-chloro-2-hydroxy-3-biphenylcarboxylate
(63) 6'-tert-butyl-2-chloro-N-(hydroxymethyl)-o-acetotoluidide,(2,4-dichlorophenoxy)acetate
(64) 2-bromo-2'-tert-butyl-6'-ethyl-N-(hydroxymethyl)acetanilide,(2,4-dichlorophenoxy)acetate
(65) 6'-tert-butyl-N-(hydroxymethyl)-2-iodo-o-acetotoluidide,(2,4-dichlorophenoxy)acetate
(66) 2-bromo-6'-tert-butyl-N-(hydroxymethyl)-o-acetotoluidide,
(67) 2-chloro-2',6'-diethyl-N-(mercaptomethyl)acetanilide, dimethyldithiocarbamate
(68) 2-chloro-2',6'-diethyl-N-(hydroxymethyl)acetanilide, picolinate
(69) 2-chloro-2',6'-diethyl-N-(hydroxymethyl)acetanilide, nicotinate
(70) 2-chloro-2',6'-diethyl-N-(hydroxymethyl)acetanilide, isonicotinate
(71) 2-chloro-2',6'-diethyl-N-(hydroxymethyl)acetanilide, o-nitro-benzoate
(72) 2-chloro-2',6'-diethyl-N-(hydroxymethyl)acetanilide, m-nitrobenzoate
(73) 2-chloro-2',6'-diethyl-N-(hydroxymethyl)acetanilide, p-nitrobenzoate
(74) 2-chloro-2',6'-diethyl-N-(hydroxymethyl)acetanilide, 5-nitro-salicylate
(75) 2-bromo-6'-tert-butyl-N-(hydroxymethyl)-o-acetotoluidide, 2,-3,6-trichlorobenzoate
(76) 2-chloro-2',6'-diethyl-N-(hydroxymethyl)acetanilide, piperonylate
(77) 2-bromo-6'-tert-butyl-N-(hydroxymethyl)-o-acetotoluidide, 5-chlorosalicylate
(78) 2-bromo-6'-tert-butyl-N-(hydroxymethyl)-o-acetotoluidide, benzoate
(79) 2-chloro-2',6'-diethyl-N-(hydroxymethyl)acetanilide, o-benzoylbenzoate In order to illustrate the advantages of the present invention, the pre-emergence herbicidal ratings of representative 2-haloacetanilides were determined in greenhouse tests in which a specific number of seeds of a number of different plants, each representing a principal botanical type, were planted in greenhouse flats.

A good grade of top soil was placed in aluminum pans and compacted to a depth of ⅜ to ½ inch from the top of the pan. On the top of the soil was placed a predetermined number of seeds of various plant species. The soil required to level fill pans after seeding was weighed into a pan, a known amount of the chemical applied in a solvent or as a wettable powder, the soil thoroughly mixed, and used as a cover layer for seeded pans. After treatment the pans were moved into a greenhouse bench where they were watered from below as needed to give adequate moisture for germination and growth.

Approximately 14 days after seeding and treating, the plants were observed and the results recorded. The herbicidal rating was obtained by means of a fixed scale based on the average percent germination of each seed lot. The ratings are defined as follows:

0 - No herbicidal activity
1 - Slight herbicidal activity
2 - Moderate herbicidal activity
3 - Severe herbicidal activity The pre-emergence herbicidal activity of the alpha-halo-acetanilides are recorded in the following table for various application rates in both surface and soil-incorporated applications.

In the table, various seeds are represented by letters as follows:

A - Soybean
B - Sugar Beet
C - Wheat
D - Rice
E - Sorghum
F - Cocklebur (common)
G - Wild Buckwheat
H - Morningglory
I - Hemp sesbania
J - Lambsquarters
K - Velvetleaf
L - Bromus Tectorum
M - Panicum spp.
N - Barnyardgrass
O - Crabgrass

PRE-EMERGENCE HERBICIDAL ACTIVITY

| Compound of Example No. | Rate lb./A | A B C D E F G H I J K L M N O |
|---|---|---|
| 1 | 1 | 0 0 0 0 1 0 0 1 0 0 0 2 2 3 3 |
| 2 | 1 | 0 1 0 0 2 3 2 0 0 1 0 1 1 3 1 |
| 3 | 1 | 1 1 0 1 1 0 2 0 1 3 1 1 2 3 3 |
| 4 | 1 | 0 0 0 0 0 2 0 2 3 0 0 1 2 2 |
| 5 | 1 | 0 2 2 1 2 0 1 1 2 2 0 2 2 3 3 |
| 6 | 1 | 1 1 0 0 1 0 2 0 1 3 2 2 2 3 2 |
| 7 | 1 | 0 3 0 1 0 0 2 0 1 2 0 0 2 3 2 |
| 8 | 1 | 0 0 0 0 1 0 2 0 0 1 1 2 2 3 3 |
| 9 | 1 | 0 0 0 0 0 0 0 0 0 1 0 3 2 3 2 |
| 13 | 5 | 0 1 0 2 3 0 0 1 0 0 1 3 3 3 3 |
| 46 | 1 | 2 2 0 0 2 0 1 1 3 3 0 2 1 2 2 |
| 48 | 1 | 0 1 0 0 0 0 0 0 0 1 0 0 3 3 1 |
| 50 | 1 | 0 2 1 1 1 0 1 0 2 1 0 2 2 3 3 |
| 52 | 1 | 1 0 2 3 2 0 0 0 1 — 0 3 3 3 3 |

The data set forth in the foregoing table clearly illustrates that the compounds of the present invention are effective herbicides and are particularly useful in the control of narrow leaf or grass weeds, even in the presence of grass crops.

The post-emergence herbicidal activity of various compounds of this invention is demonstrated as follows. The active ingredients are applied in spray form to 28 day old specimens of various plant species. The spray, an acetone-water solution containing active ingredient and a surfactant (35 parts butylamine salt of dodecylbenzenesulfonic acid and 65 parts tall oil condensed with ethylene oxide in the ratio of 11 moles ethylene oxide to 1 mole tall oil), is applied to the plants in different sets of pans at several rates (pounds per acre) of active ingredient. The treated plants are placed in a greenhouse and the effects are observed and recorded after approximately 14 days.

The post-emergence herbicidal activity index used in the following table is as follows:

| PLANT RESPONSE | INDEX |
|---|---|
| No injury | 0 |
| Slight injury | 1 |
| Moderate injury | 2 |
| Severe injury | 3 |
| Killed | 4 |

The plant species utilized in these tests are identified by letter in accordance with the following legend:

A - Morningglory
B - Wild oat
C - Brome
D - Rye Grass
E - Radish
F - Sugar Beet
G - Cotton
H - Corn
I - Foxtail
J - Barnyardgrass
K - Crabgrass
L - Pigweed
M - Soybean
N - Wild Buckwheat
O - Tomato
P - Sorghum
Q - Rice

POST-EMERGENCE HERBICIDAL ACTIVITY

| Cpd. of Ex. No. | Rate lb./A | A B C D E F G H I J K L M N O P Q |
|---|---|---|
| 52 | 0.4 | 4 1 0 0 4 4 4 2 1 3 3 4 4 4 4 2 2 |
| 55 | 0.4 | 4 2 1 1 4 4 4 2 3 3 3 4 4 3 4 2 2 |
| 62 | 1.0 | 3 0 0 0 4 4 — — 1 — 1 4 4 4 4 0 — |
| 64 | 1.0 | 4 1 0 1 4 4 3 3 2 2 2 4 3 4 4 1 1 |

The herbicidal compositions of this invention including concentrates which require dilution prior to application contain at least one active ingredient and an adjuvant in liquid or solid form. The compositions are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as a finely-divided solid, a liquid of organic origin, water, a wetting agent, a dispersing agent, an emulsifying agent or any suitable combination of these.

The compositions of this invention, particularly liquids and wettable powders, preferably contain as a conditioning agent one or more surface-active agents in amounts sufficient to render a given composition readily dispersible water or in oil. The incorporation of a surface-active agent into the compositions greatly enhances their efficacy. By the term "surface-active agent" it is understood that wetting agents, dispersing agents, suspending agents and emulsifying agents are included therein. Anionic, cationic and non-ionic agents can be used with equal facility.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters petroleum sulfonates, sulfonated vegetable oils, ditertiary acetylenic glycols, polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, and polymethylene bisnaphthalenesulfonate.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate. The wettable powders compositions of this invention usually contain from about 5 to about 95 parts of active ingredient, from about 0.25 to 25 parts of wetting agent, from about 0.25 to 25 parts of dispersant and from 4.5 to about 94.5 parts of inert solid extender, all parts being by weight of the total composition. Where required, from about 0.1 to 2.0 parts of the solid inert extender can be replaced by a corrosion inhibitor or antifoaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed, coverage is very uniform.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. The emulsifiable oil compositions generally contain from about 5 to 95 parts active ingredient, about 1 to 50 parts surface active agent and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surface active agent such as those listed hereinbefore can be present in the compositiion. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitic clays. These extenders are sprayed or blended with the active ingredient to form the herbicidal granules.

The granular compositions of this invention generally contain from about 5 parts to about 30 parts by weight of active ingredient per 100 parts by weight of clay and 0 to about 5 parts by weight of surface active agent per 100 parts by weight of particulate clay. The preferred granular compositions contain from about 10 parts to about 25 parts by weight of active ingredient per 100 parts by weight of clay.

The compositions of this invention can also contain other additaments, for example fertilizers, herbicides, other pesticides and the like used as adjuvants or in combination with any of the above-described adjuvants. Chemicals useful in combination with the active ingredients of this invention include for example triazines, ureas, carbamates, acetamides, acetanilides, uracils, acetic acids, phenols, thiolcarbamates, triazoles, benzoic acids, nitriles and the like such as:

3-amino-2,5-dichlorobenzoic acid
3-amino-1,2,4-triazole
2-methoxy-4-ethylamino-6-isopropylamino-s-triazine
2-chloro-4-ethylamino-6-isopropylamino-s-triazine
2-chloro-N,N-diallylacetamide
2-chloroallyl diethyldithiocarbamate
N'-(4-chlorophenoxy) phenyl-N,N-dimethylurea
1,1'-dimethyl-4,4'-bipyridinium dichloride
isopropyl N-(3-chlorophenyl)carbamate
2,2-dichloropropionic acid
S-2,3-dichloroallyl N,N-diisopropylthiolcarbamate
2-methoxy-3,6-dichlorobenzoic acid
2,6-dichlorobenzonitrile
N,N-dimethyl-2,2-diphenylacetamide
6,7-dihydrodipyrido(1,2-a:2',1'-c)-pyrazidiinium salt
3-(3,4-dichlorophenyl)-1,1-dimethylurea
4,6-dinitro-o-sec-butylphenol
2-methyl-4,6-dinitrophenol
ethyl N,N-dipropylthiolcarbamate
2,3,6-trichlorophenylacetic acid
5-bromo-3-isopropyl-6-methyluracil
3-(3,4-dichlorophenyl)-1-methoxy-1-methylurea
2-methyl-4-chlorophenoxyacetic acid
3-(p-chlorophenyl)-1,1-dimethylurea
1-butyl-3-(3,4-dichlorophenyl)-1-methylurea
N-1-naphthylphthalamic acid
1,1'-dimethyl-4,4'-bipyridinium salt
2-chloro-4,6-bis(isopropylamino)-s-triazine
2-chloro-4,6-bis(ethylamino)-s-triazine
2,4-dichlorophenyl-4'-nitrophenyl ether
alpha, alpha, alpha-trifluoro-2,6-dinitro-N,N-dipropyl-p-toluidine
S-propyl dipropylthiolcarbamate
2,4-dichlorophenoxyacetic acid
N-isopropyl-2-chloroacetanilide
2',6'-diethyl-N-methoxymethyl-2-chloroacetanilide
monosodium acid methanearsonate
disodium methanearsonate
N-(1,1-dimethylpropynyl)-3,5-dichlorobenzamide Fertilizers useful in combination with the active ingredients include for example ammonium nitrate, urea, potash, and superphosphate. Other useful additaments include materials in which plant organisms take root and grow such as compost, manure, humus, sand and the like.

When operating in accordance with the present invention, effective amounts of the acetanilides are applied to the plants, or to soil containing the plants, or are incorporated into aquatic media in any convenient fashion. The application of liquid and particulate solid compositions to plants or soil can be carried out by conventional methods, e.g., power dusters, boom and hand sprayers and spray dusters. The compositions can also be applied from airplanes as a dust or a spray because of their effectiveness at low dosages. The application of herbicidal compositions to aquatic plants is usually carried out by adding the compositions to the aquatic media in the area where control of the aquatic plants is desired.

The application of an effective amount of the compounds of this invention to the plant is essential and critical for the practice of the present invention. The exact amount of active ingredient to be employed is dependent upon various factors, including the plant species and stage of development thereof, the type and condition of soil, the amount of rainfall and the specific acetanilide employed. In non-selective pre-emergence treatments, the compounds of this invention are usually applied as an approximate rate of from 1 to 25 pounds per acre. In selective pre-emergence application to the plants or to the soil containing a dosage of from 0.05 to about 5 pounds of acetanilide per acre is usually employed. Lower or higher rates may be required in some instances. One skilled in the art can readily determine from this specification, including the examples, the optimum rate to be applied in any particular case.

The term "soil" is employed in its broadest sense to be inclusive of all conventional soils as defined in Webster's New International Dictionary, Second Edition, Unabridged (1961). Thus the term refers to any substance or media in which vegetation may take root and grow, and includes not only earth but also compost, manure, muck, humus, sand and the like, adapted to support plant growth.

Although the invention is described with respect to specific modifications, the details thereof are not to be construed as limitations except to the extent indicated in the following claims.

What is claimed is:

1. A herbicidal composition comprising an adjuvant and an effective amount of a compound of the formula

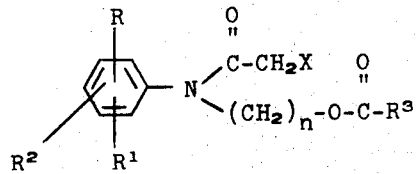

wherein:

R and $R^1$ are hydrogen, alkyl or alkoxy having at least 1 and not more than 10 carbon atoms and can be like or unlike, $R^2$ is hydrogen, alkyl or alkoxy having at least 1 and not more than 10 carbon atoms, $NO_2$ or halogen, $R^3$ is haloaryl or haloaryloxyalkyl having at least 6 and not more than 24 carbon atoms;

X is chlorine, bromine or iodine, and $n$ is an integer of 1 or 2.

2. A herbicidal composition of claim 1 wherein R and $R^1$ are alkyl and are in the 2 and 6 positions.

3. A composition of claim 2 wherein R and $R^1$ are ethyl.

4. A composition of claim 2 wherein $n$ is 1.

5. Composition according to claim 1 wherein said compound is 2-bromo-6'-tert-butyl-N-(2,4-dichlorophenoxyacetoxymethyl)-o-acetotoluide.

6. A herbicidal method which comprises applying an effective amount of a compound of the formula

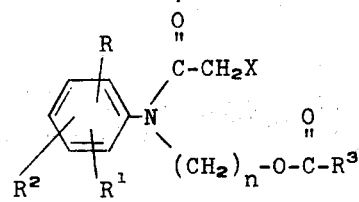

wherein:

R and $R^1$ are hydrogen, alkyl or alkoxy having at least 1 and not more than 10 carbon atoms and can be like or unlike, $R^2$ is hydrogen, alkyl or alkoxy having at least 1 and not more than 10 carbon atoms, $NO_2$ or halogen, $R^3$ is haloaryl or haloaryloxyalkyl having at least 6 and not more than 24 carbon atoms;

X is chlorine, bromine or iodine, and $n$ is an integer of 1 or 2.

7. A method of claim 6 wherein R and $R^1$ are alkyl and are in the 2 and 6 positions.

8. A method of claim 7 wherein R and $R^1$ are ethyl.

9. A method of claim 7 wherein $n$ is 1.

10. Method according to claim 6 wherein said compound is 2-bromo-6'-tert-butyl-N-(2,4-dichlorophenoxyacetoxymethyl)-o-acetotoluidide.

* * * * *

UNITED STATES PATENT OFFICE
CERTIFICATE OF CORRECTION

PATENT NO. : 3,884,673
DATED : May 20, 1975
INVENTOR(S) : John F. Olin

It is certified that error appears in the above-identified patent and that said Letters Patent are hereby corrected as shown below:

Column 5, line 61 "(butryloxymethyl-" should read -- (butryloxyethyl- --.

Column 6, line 9 "O" should read -- o --.

Column 6, line 22 "Acetotoluidide" should read -- aceto-toluidide --.

Column 6, line 38, the word "salicylate" was left out of the patent after the word "acetotoluidide".

Column 6, line 48, "o-nitro-benzoate" should read -- o-nitrobenzoate --.

Column 6, line 54 "5-nitro-salicylate" should read -- 5-nitrosalicylate --.

Column 7, line 56, "52" should read -- 51 --.

Column 11, line 15, "as" should read -- at --.

Signed and Sealed this

Eighteenth Day of October 1977

[SEAL]

Attest:

RUTH C. MASON
Attesting Officer

LUTRELLE F. PARKER
Acting Commissioner of Patents and Trademarks